(12) United States Patent
Lindholm

(10) Patent No.: US 6,957,065 B1
(45) Date of Patent: Oct. 18, 2005

(54) MOBILE COMMUNICATIONS NETWORK

(75) Inventor: Heikki Lindholm, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/958,720

(22) PCT Filed: Mar. 30, 2000

(86) PCT No.: PCT/EP00/02859

§ 371 (c)(1),
(2), (4) Date: Feb. 22, 2002

(87) PCT Pub. No.: WO00/62565

PCT Pub. Date: Oct. 19, 2000

(30) Foreign Application Priority Data

Apr. 12, 1999 (GB) ................................... 9908315

(51) Int. Cl.[7] .............................................. H04Q 7/20
(52) U.S. Cl. ...................... 455/433; 370/469; 370/355; 370/356
(58) Field of Search .............................. 455/403, 414, 455/1, 414.7, 418, 424, 433, 439, 445; 370/469, 370/466, 467, 352, 353, 354, 355, 356, 357, 370/218

(56) References Cited

U.S. PATENT DOCUMENTS

| | | | |
|---|---|---|---|
| 5,629,974 A | 5/1997 | Rajala et al. ................... | 379/58 |
| 5,729,537 A * | 3/1998 | Billstrom ..................... | 370/329 |
| 5,793,762 A | 8/1998 | Penners et al. .............. | 370/389 |
| 5,956,331 A | 9/1999 | Rautiola et al. ............. | 370/338 |
| 6,185,427 B1 * | 2/2001 | Krasner et al. ........... | 455/456.2 |
| 6,192,038 B1 * | 2/2001 | Wallerius et al. ........... | 370/328 |
| 6,230,005 B1 * | 5/2001 | Le et al. .................. | 455/414.1 |
| 6,349,094 B1 * | 2/2002 | Vastano et al. ............. | 370/328 |
| 6,359,904 B1 * | 3/2002 | Hamalainen et al. ....... | 370/469 |
| 6,677,894 B2 * | 1/2004 | Sheynblat et al. ....... | 342/357.1 |
| 2002/0118670 A1 * | 8/2002 | Kari ........................... | 370/352 |

FOREIGN PATENT DOCUMENTS

| | | |
|---|---|---|
| EP | 0766490 | 4/1997 |
| WO | 9827698 | 6/1998 |
| WO | 0119093 | 3/2001 |

OTHER PUBLICATIONS

"Protocol Architecture for Universal Personal Computing", Y. Li et al, *Communications*, vol. 15, No. 8, Oct. 1997, p-1467-1476.

* cited by examiner

*Primary Examiner*—CongVan Tran

(57) ABSTRACT

A mobile communications network comprises a network manager for managing a plurality of mobile stations in the network, a first database holding subscriber information for mobile station subscribers in the network and in communication with the network manager via a signalling interface over which information is conveyed using one of a plurality of signalling protocols, at least one second database for communication with a packet data network via a packet data interface over which information is conveyed using one of a plurality of packet transmission protocols, said second database holding subscriber information for subscribers connected via said packet data network, and a protocol converter in communication with the at least one second database via a packet data interface and with the network manager via a signalling interface, and operable to convert between a signalling protocol used on the signalling interface and a packet transmission protocol used on the packet data interface.

8 Claims, 3 Drawing Sheets

MOBILE COMMUNICATIONS NETWORK

BACKGROUND OF THE INVENTION (1) Field of the Invention

The present invention relates to a mobile communications network which has access to an external packet DATA network such as the internet.

(2) Description of Related Art

There are currently a significant number of internet protocol (IP) service providers using fixed telephone networks. It would be desirable to extend these to using mobile networks. It is in principle possible to connect messages conveyed through a mobile communications network to the internet or other switched packet data network (PDN) using general packet radio services (GPRS), a standard which is a packet data transfer standard compatible with GSM. It is supported in some GSM networks through the use of GPRS support nodes (GSN). However, access to the internet or other packet data network in this way currently requires that a service provider provide a suitable gateway GPRS service node (GGSN) and a home location register (HLR) and subscriber database which communicates with it in a manner compatible with existing GSM signalling standards. Thus, a service provider would need to set up a home location register and subscriber database and gateway GPRS service node capable of utilising at least one of the appropriate signalling protocols used in the SS7 stack specified by GSM. This requires a significant investment on the part of the service provider and as such constitutes a deterrent for providing more open access to the internet using the mobile communication network.

U.S. Pat. No. 5,793,762 describes a system and method for providing Internet and data voice services to mobile subscribers. The system includes a Home Location Register (HLR), which is operative to store and provide subscription data and keep track of where at least one mobile terminal is registered in order to deliver calls thereto.

WO 98/27698 describes an arrangement for establishing a packet switched and a circuit switched connection between a first telecommunications system (NSS) and a second telecommunications system (WAN) comprising: a packet switched converter (PSDC), a circuit switched converter (CSDC) and a common data communications controller (CDCC) for establishing a connection between the converters (PSDC, CSDC).

EP 0 766 490 relates to an integrated data transfer system, the extensive basis of which is constituted by a general cellular radio system, and in which a radio local area network is used for communicating between data terminals in small areas with dense communications. In addition, the Internet is used for fast data transfer. The connection between networks is handled by a gateway computer, which in view of the cellular radio system operates like a Base Station Controller (BSC).

BRIEF SUMMARY OF THE INVENTION

According to the present invention there is provided a mobile communications network comprising: a network manager (MSC) for managing a plurality of mobile stations in the network; a first database (HLR) holding subscriber information for mobile station subscribers in the network and in communication with the network manager via a signalling interface over which information is conveyed using one of a plurality of signalling protocols; at least one second database (LHLR) for communication with a packet data network via a packet data interface over which information is conveyed using one of a plurality of packet transmission protocols, said second database holding subscriber information for subscribers connected via said packet data network; and a protocol converter in communication with the at least one second database via a packet data interface and with the network manager via a signalling interface, and operable to convert between a signalling protocol used on the signalling interface and a packet transmission protocol used on the packet data interface.

The first database can be a home location register as used in the GSM standard to hold subscriber information. The at least one second database can constitute a supplementary home location register for holding subscriber information relating to users connected via the packet data network. It is referred to herein as a "little HLR". More than one of these "little HLRs" may be provided in a network. It can be implemented using software operating on commercial UNIX or NT servers for example, which is a much cheaper investment for new service providers than the investment in the more complex signalling protocols currently used in GSM. The provision of a separate, second database also provides a service provider with more control for managing his subscribers and services.

Thus, the service provider need provide only the second database, and, optionally a gateway for access to other supplementary services outside the mobile communications network connected to the second database via a packet data interface. The service provider can then be connected to the mobile networks through a roaming broker which provides the protocol converter in the form of an interworking unit.

BRIEF DESCRIPTION OF THE DRAWINGS

For a better understanding of the present invention and to show how the same may be carried into effect reference will now be made by way of example to the accompanying drawings in which.

DETAILED DESCRIPTION OF THE INVENTION

Figure 1:
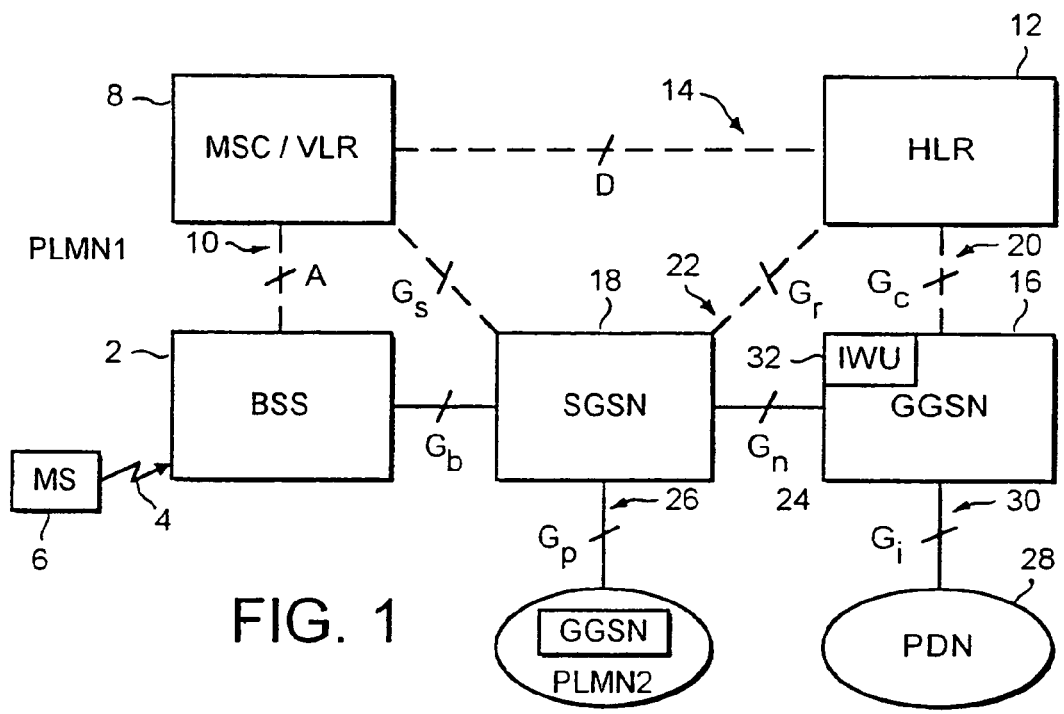
FIG. 1 is a schematic diagram of relevant components of the logical architecture of a mobile network.

FIG. 1 illustrates relevant components of a logical architecture for supporting a mobile communications network, in this case the standard set down for a global system for mobile communications, referred to herein as GSM. In addition to providing services for mobile phones, the GSM network is extended to provide other services, referred to herein as general packet radio services (GPRS). The logical architecture comprises a base station system 2 which incorporates base transceiver stations (BTS) and base station controllers (BSC) for controlling the base transceiver stations. The base transceiver stations themselves receive RF signals 4 from mobile stations 6. The base station system 2 is connected to a network manager in the form of a mobile switching centre (MSC) 8 which controls the operations of the mobile communication network. The mobile switching centre 8 is associated with a visitor location register (VLR) which is a database containing information about mobile subscribers that visit the area governed by the mobile switching centre 8. The mobile switching centre 8 communicates with the base station system 2 via an A interface 10. The mobile switching centre 8 and its visitor location register are also in communication with a home location register (HLR) 12 via a D interface 14. The home location register is a database that contains all the subscriber specific information of subscribers in the home public land mobile network (PLMN). The network provides support for GPRS services by incorporating a gateway GPRS support node 16 and a serving GPRS support node 18. The gateway GPRS support node 16 communicates with the home location register 12 via a $G_c$ interface 20. The serving GPRS support node 18 communicates with the home location register 12 via a $G_r$ interface 22. The gateway GPRS support node 16 communicates with the serving GPRS support node 18 via a $G_n$ interface 24. The logical architecture components 2, 8, 12, 16 and 18 which have just been discussed can be considered to form part of a first public land mobile network PLMN1. The serving GPRS support node allows connection via a $G_p$ interface 26 to a second public land mobile network PLMN2. The gateway GPRS support node 16 additionally allows access to a packet data network (PDN) 28 via a $G_i$ interface 30.

Figure 2:
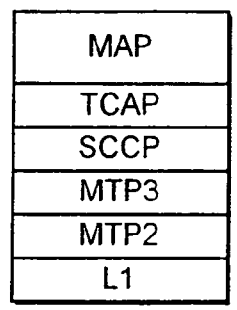
FIG. 2 is a diagram of a signalling protocol stack.

It will readily be appreciated that the physical implementation of the logical architecture components and the interfaces between them significantly affect how information can be transferred between the components. Data transfer protocols which are suited to one medium may not transfer easily to other mediums. In order to transfer information through the network as sufficiently and reliably as possible, a number of protocols are used across each interface according to a so-called protocol stack. Such a protocol stack is used for example to convey information between the mobile switching centre 8 and home location register 12 via the D interface 14. This stack is illustrated in FIG. 2 and is referred to as the SS7 stack according to the GSM standard. The protocol stack of FIG. 2 includes a number of protocol layers as follows.

A mobile application part (MAP) layer is an application which generates a protocol to update location registers such as the visitor location register (VLR) and the home location register (HLR) 12.

A transaction capabilities application part (TCAP) is a simple protocol that provides features for establishing a signalling dialogue between nodes when no speech path is required.

A signalling connection control part (SCCP) provides enhanced addressing and translation features that allow the transfer of signalling messages between two indirectly connected nodes when no speech connection is required.

The message transfer parts (MTP2, MTP3) provide reliable message transfer between nodes in the network.

A first protocol layer L1, provides the basic signalling protocol for RF messages.

Figure 2A:
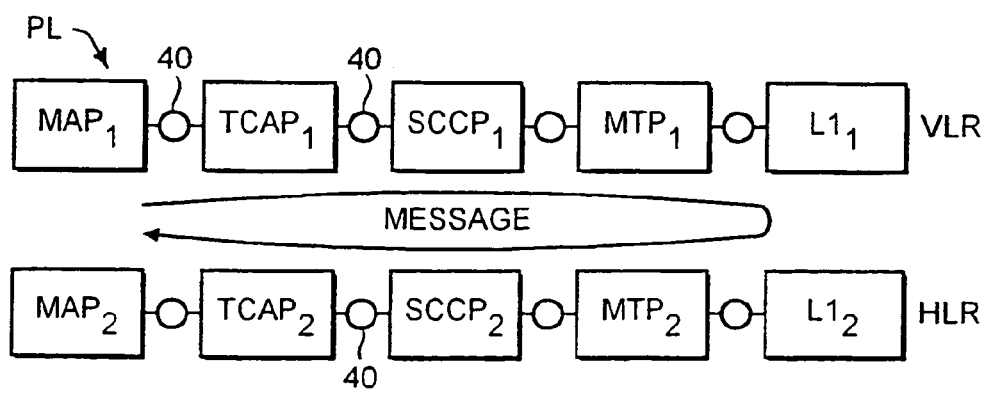
FIG. 2a is a diagram illustrating use of a protocol stack.

The use of a protocol stack is known in the art but is briefly described herein with reference to FIG. 2a. In FIG. 2a, each block PL denotes a protocol layer of the stack of FIG. 2. For the sake of simplification, the message transfer parts MTP1, MTP2 have been combined in a single block and denoted only MTP. A first protocol stack has layers denoted with the suffix 1, and a second protocol stack has layers denoted with the suffix 2. Consider the example of a message issued by the mobile switching centre MSC 8 according to the MAP protocol, for example for updating a register in the home location register 12. Consider that the first protocol stack belongs to the visitor location register VLR and the second protocol stack belongs to the home location register HLR. Depending on the nature of the D interface 14, the message can be conveyed using one or more of the protocol layers of a protocol stack. Consider that all of the protocol layers of the stack are needed. The message will be conveyed from the MAP1 layer to the TCAP1 layer via protocol conversion and checking units 40. These units 40 add the necessary information to the message to change the protocol, and checks for any errors. A similar unit (of course adapted to each protocol), lies between each of the protocol layer blocks. If all of the layers of the protocol stack are used, the message will finally be rendered according to the L1 protocol and will be transferred using that protocol to the L12 protocol layer of the home location register. The protocol will then be altered, in reverse, through the protocol layers up to the MAP2 layer. It is not necessary to use all the protocol layers in a stack. It is quite feasible to consider, for example, a message conveyed between the MAP1 and MAP2 protocol layers, or indeed between any pair of protocol layers in the stacks.

Figure 3:
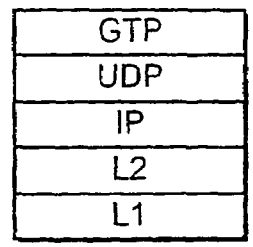
FIG. 3 is a diagram of a data transmission protocol stack.

It is not practical however to include in one protocol stack all of the possible protocols that may be required in a mobile communication network and to support a large number of ancillary services such as GPRS, PDN etc. Therefore, different interfaces provide different protocols. FIG. 3 illustrates the protocol stack used to convey information between the gateway GPRS support node 16 and the serving GPRS support node 18 via the $G_n$ interface 24. This stack includes first and second message transfer layer protocols L1, L2, an internet protocol layer IP, a user datagram protocol UDP and a GPRS tunnelling protocol GTP. These protocols are used however in the same way as described above with reference to FIG. 2a.

It will be appreciated that if it is necessary, for example, to convey a message between the HLR 12 and the PDN 28 a number of steps are required. The message is sent across the $G_c$ interface 20 from the home location register 12 using the SS7 signalling stack of FIG. 2 to the gateway GPRS support node 16. From there, it is transmitted via the $G_i$ interface 30 using the data transmission protocol stack according to FIG. 3. Thus, some conversion is necessary. This is carried out by an interworking unit 32 which receives a message conveyed by the $G_c$ interface 20 according to a first protocol of the SS7 stack and converts that protocol into one of the protocols of the stack of FIG. 3.

After that, the protocol layers of the data transmission stack of FIG. 3 can be used as normal on the $G_i$ interface 30, and also the $G_n$ interface 24.

Information about subscribers to services accessible by the GGSN 16 and GSSN 18 is held in the home location register 12. Thus, with the architecture of FIG. 1, a service provider wishing to use the facilities of a mobile communication network needs to provide not only a suitable gateway node with a data transmission protocol, but also, a home location register for managing those services. For these purposes, he is required to implement the SS7 stack of FIG. 2. This is expensive and can deter potential new service providers.

Figure 4:
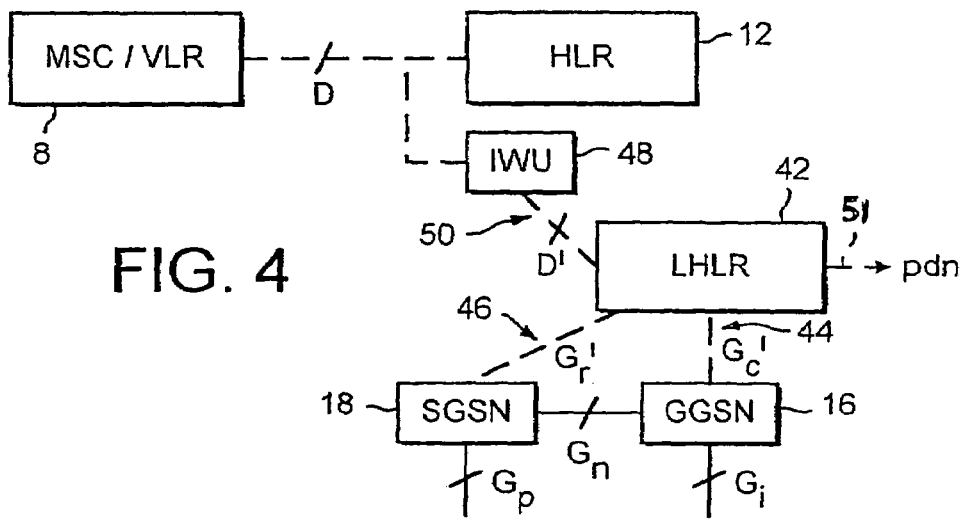
FIG. 4 illustrates modified components of a logical architecture for the network according to one embodiment of the invention.

The logical architecture of FIG. 4 overcomes this problem. In FIG. 4, like numerals denote like parts as in FIG. 1 and parts which have not been modified are omitted from FIG. 4 entirely for the sake of clarity. Thus, in respects other than those illustrated in FIG. 4, the logical architecture is the same as FIG. 1.

Figure 5:
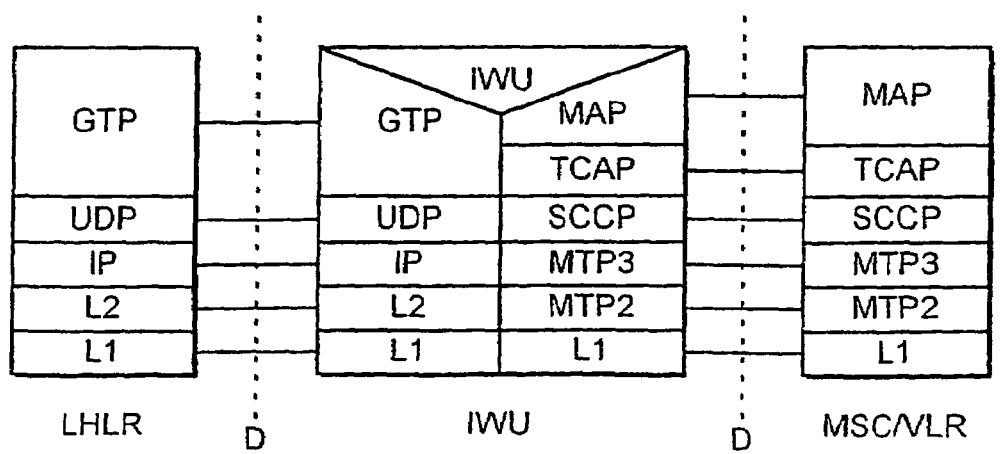
FIG. 5 is a diagram illustrating operation of an interworking unit.

In addition to the architectural components illustrated in FIG. 1, there is a so-called little home location register (LHLR) 42. This is provided to manage subscriber services which are accessed through the packet data network PDN 28 via gateway GPRS support node 16, or directly via the interface 51. The little home location register 42 communicates with the gateway GPRS support node 16 via a $G_c'$ interface 44. It communicates with the serving GPRS support node 18 via a $G_r'$ interface 46. These interfaces use the data transmission stack of FIG. 3 instead of the SS7 stack used on the equivalent interfaces $G_c$, $G_r$ in FIG. 1. An interworking unit 48 is provided which communicates with the little home location register 42 via a D' interface 50. The D' interface also uses the protocol stack of FIG. 3. The interworking unit 48 provides a facility to convert between any of the protocols in the protocol stack of FIG. 3 to any of the protocols in the SS7 stack of FIG. 2 to allow communication if necessary with the mobile switching centre 8 and its visitor location register. This is illustrated in FIG. 5.

Figure 6:
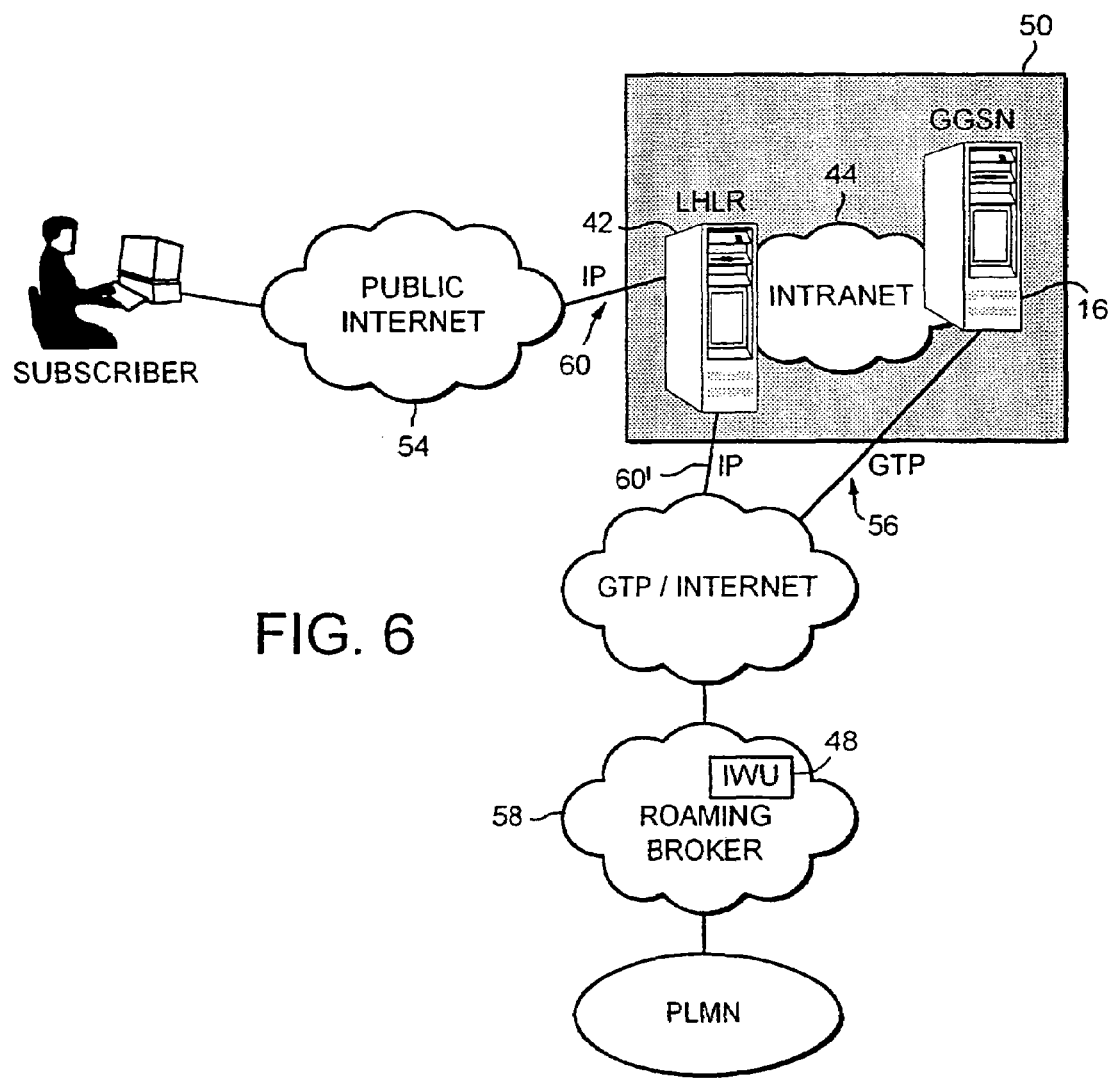
FIG. 6 is a diagram illustrating one application of the invention.

The provision of a little home location register 42 which can communicate using protocols more suited to data packet transmission allows a number of different facilities to be provided as illustrated for example in FIG. 6.

FIG. 6 illustrates a service provider SP which provides a little home location register 42 and a gateway GPRS support node 16 connected to one another via an intranet connection 44. The protocol stack of FIG. 3 can be used to transmit data between the little home location register 42 and the GGSN 16 via the intranet 44. In fact, the intranet provides the $G_c'$ interface. The little home location register 42 is connected to the public internet 54 via the interface 60 on which transmission is executed using the internet protocol IP. It also has another interface 60' which likewise uses the internet protocol IP to an internet forming part of the GPRS services. This is also connected to the GGSN 16 via an interface 56 which uses the GPRS tunnelling protocol GTP.

A roaming broker 58 connects the GTP/internet services to the PLMN and provides the interworking unit (IWU) 48 for the necessary protocol conversions for messages from the PLMN to the little home location register 42.

Thus, a subscriber can be connected to the PLMN through the public internet 54 and little home location register 42. The connection can be entirely on the internet using the IP interfaces 60, 60' or through the intranet 44 and GTP interface 56.

More than one little home location register may be provided in a network having one home location register HLR and one interworking unit IWU.

What is claimed is:

1. A mobile communications network comprising:
   a network manager (8) for managing a plurality of mobile stations (6) in the network;
   a first database (12) holding subscriber information for mobile station subscribers in the network and in communication with the network manager (8) via a signalling interface (14) over which information is conveyed using one of a plurality of signalling protocols;
   a gateway node (16) in communication with a packet data network for supporting general packet radio services;
   characterised in that said communications network comprising:
   at least one second database (42) in communication with the packet data network over a first packet data interface (51) and with said gateway node over a second packet data interface (44) such that information is conveyed over said first and second packet data interfaces using one of a plurality of packet transmission protocols, said second database holding subscriber information for subscribers connected via said packet data network;
   a protocol converter (48) in communication with the at least one second database (42) via a third packet data interface (50) and with the network manager (8) via a signalling interface, and operable to convert between a signalling protocol used on the signalling interface and a packet transmission protocol used on the packet data interface; and
   wherein said first (51), second (44) and third (50) packet data interfaces use the same transmission protocol.

2. A network according to claim 1, wherein the plurality of signalling protocols are arranged in a signalling protocol stack.

3. A network according to claim 2, wherein the signalling protocol stack is the SS7 stack specified according to the GSM standard.

4. A network according to claim 1, wherein the plurality of packet transmission protocols are arranged in a packet transmission protocol stack.

5. A network according to claim 4, wherein the packet data network (28) is the internet (54) and one of said packet transmission protocols is an internet protocol (60, 60') for transmitting information over the internet.

6. A network according to claim 1, wherein said gateway node (16) is used for access to supplementary services outside the mobile communications network.

7. A network according to claim 1, wherein the first database (12) is a home location register according to the GSM standard.

8. A network according to claim 1, wherein the network manager (8) includes a visitor location register for holding information about mobile station subscribers visiting the network.

* * * * *